Figure 1:
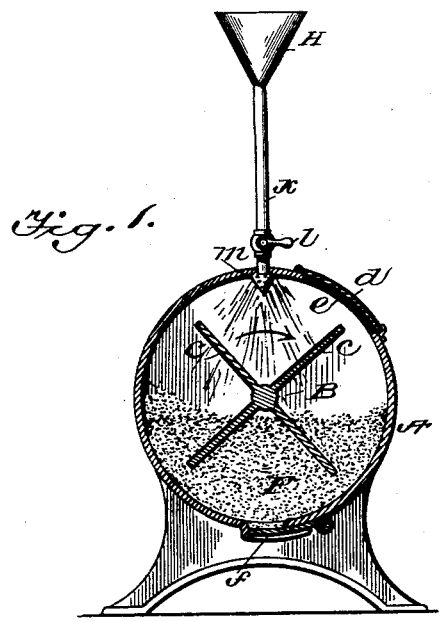

(No Model.)

C. M. HIGGINS.
ADHESIVE.

No. 580,174. Patented Apr. 6, 1897.

Witnesses
John Irvine
W. E. Clendaniel.

Inventor
Chas. M. Higgins.

UNITED STATES PATENT OFFICE.

CHARLES M. HIGGINS, OF BROOKLYN, NEW YORK.

ADHESIVE.

SPECIFICATION forming part of Letters Patent No. 580,174, dated April 6, 1897.

Application filed June 10, 1896. Serial No. 595,028. (No specimens.)

*To all whom it may concern:*

Be it known that I, CHARLES M. HIGGINS, a citizen of the United States, residing at Brooklyn, in the county of Kings and State of New York, have invented a certain new and useful Improvement in Adhesive Compounds, of which the following is a specification, reference being had to the accompanying drawings.

The object of my invention is to produce an adhesive compound in the form of a dry powder put up in bulk or in small packages or masses which may be used for the production of sizes, pastes, or mucilages when dissolved in hot water and will give the effect of manufactured dextrine or a superior effect at much less cost than actual dextrine and in a manner which will enable the desired quality of the resulting paste or size to be more readily controlled and determined by the user or consumer than is possible with manufactured dextrine.

To this end I produce a new article of manufacture consisting, essentially, of raw or unconverted starch or flour in a dry or powdered state impregnated with some digesting or converting acid or agent adapted in the presence of heat and moisture to convert the starch or flour into a soluble or dextrine state, so that when such impregnated starch is dissolved in hot or boiling water it will produce a solution of actual dextrine or a solution more or less approaching actual dextrine, according to the temperature and time employed in making such solution, which is under the control of the user. By this means a dextrine solution or paste can be produced very rapidly at the will of the user at much less cost than can be obtained from manufactured dextrine and in a manner which enables any desired degree of conversion to be imparted to the starch or any desired quality to be given to the resulting paste or solution from gelatinous starch to absolute dextrine. This acidulated starch powder I put up in suitable receptacles or packages, and I include in the same package a separate mass of neutralizing alkaline powder duly proportioned to the contained mass of acidulated starch, but inclosed in a separate receptacle or envelop to isolate it from the starch and embedded preferably within the mass of starch and within the larger package inclosing the same. After a quantity of the impregnated starch has been dissolved in hot water a due proportion of the alkaline powder may be added thereto to neutralize the acid and perfect the product. I prefer to impregnate the starch with sulfuric acid and boracic acid and to form the neutralizing powder of caustic soda or borax in a powdered form.

My invention therefore consists, mainly, in the features above outlined, as hereinafter fully set forth and claimed.

Figure 2:
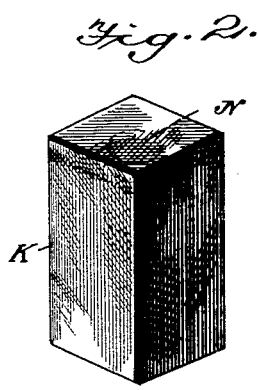
Figure 4:
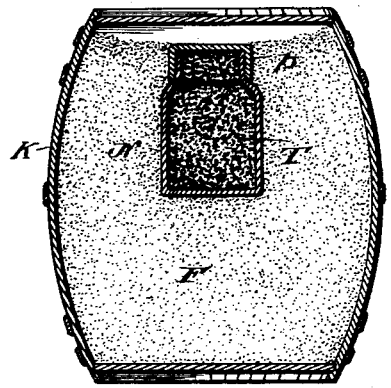
Figure 3:
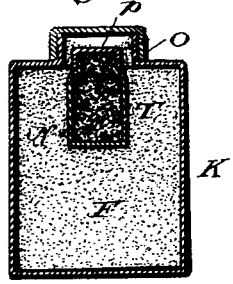

In the drawings annexed, Figure 1 represents a cross-sectional view of an apparatus by which my improved adhesive compound or powder can be produced or manufactured. Fig. 2 gives a perspective view of a commercial package of the compound sealed ready for sale and including the neutralizing-powder within the same. Fig. 3 is a vertical section of a similar commercial package of somewhat different form, showing the isolated alkaline powder within the same. Fig. 4 represents a vertical section of a larger package of barrel size with the alkaline powder embedded but isolated within the same.

In Fig. 1, A represents a large drum or cylinder through which a central shaft B extends and which can be revolved by any suitable power. From the shaft B extend a number of radial stirring or agitating arms or mixers $c\,c$, which will thoroughly stir or mix any materials put into the drum. The drum has an opening $e$ covered by a door $d$ at the top, through which the material can be put into the same, and has also an opening in the base covered by a slide or valve $f$, through which the material can be removed.

H indicates a funnel or reservoir placed above the drum, from which a pipe $k$, governed by a valve $l$, extends to the drum and is terminated within the drum by a hose or sprinkler $m$, whereby any liquid put into the reservoir H can be distributed in a fine spray or shower within the drum and can be regulated by the valve $l$.

In producing my improved compound I therefore put a quantity of raw dry starch or flour into the drum A, as indicated at F, which can be kept constantly stirred or agitated by the mixer B $c$. I also put a quantity of acid properly diluted with water into the reservoir H, and while the stirrer B $c$ is revolving I open the valve *l* and allow a fine spray or shower of the diluted acid to fall upon the mass of starch, which acid soon becomes thoroughly stirred into the starch and thus evenly mixed therewith, so that the starch soon becomes uniformly impregnated with the dilute acid, which will be permanently absorbed and held within the pores or interstices of the starch.

Dry starch, as is well known, is a very absorbent material and will readily hold and retain such charge of dilute acid and give hardly any indication of its presence, so that the impregnated starch or powder will be little different in appearance or touch from the untreated starch. I do not limit myself to any special kind or amount of acid, provided it is of such kind and quantity as will convert the starch into dextrine more or less perfectly under the action of heat and moisture. I prefer, however, to use either sulfuric, sulfurous, nitric, or muriatic acid and in proportions of, say, preferably two ounces of commercial sulfuric acid to twenty ounces of water to every ten pounds of raw starch. Some of the water of dilution will of course afterward evaporate from the starch, but most of it will be held by the starch, and the sulfuric acid, which is itself deliquescent or attractive of moisture and not volatile, will of course all be held permanently absorbed in the starch. After the starch has thus been fully and evenly impregnated with the proper amount of acid it is removed from the drum through the exit-valve *f* and may be stored in bulk or packed in any suitable receptacles or packages for the market. When thus prepared, the raw impregnated starch or flour forms a new and valuable article of manufacture, as it can be manufactured and sold at much less than either white or yellow dextrine, and yet will produce the same effect as dextrine, or, in fact, a better effect when dissolved in hot water or water heated to boiling or nearly so. This impregnated starch may be kept in any suitable receptacle in bulk or may be packed in small individual masses either in cloth or paper bags or sacks or in paper or wooden boxes or barrels at any ordinary atmospheric temperatures without change or deterioration for any length of time, the absorbed acid remaining inert on the starch, but ready to act when exposed to sufficient heat and moisture.

Exposure of the impregnated powder to the air for some time will not cause it to deteriorate, as the acid will still be held by absorption in the starch and will not evaporate, and being of such relatively small amount compared with the starch its presence will be hardly apparent and hence in no way objectionable in practical use. When, however, this powder is dissolved in hot water, it will first form a starch paste or jelly at a temperature between 155° to 165° Fahrenheit, and at this temperature it will form a smoother paste or jelly than if no acid were present, as the acid begins to act in converting the starch to a soluble form at once. As soon, however, as the temperature is raised beyond 170° the acid acts positively to convert the starch to the soluble or dextrine state, which becomes more perfect as the temperature increases toward the boiling-point and the time of the solution is extended. Hence as the temperature and time are extended the starch paste will lose its gelatinous form and become more or less liquid and acquire a more or less converted or dextrine form, according to the desire or will of the operator, determined by the amount of the impregnated starch to the mass of water used, the temperature of the solution, and the time consumed in making the solution, so that by this means a starch paste or a dextrine paste, a liquid dextrine solution, mucilage or size, or even a glucose syrup can be produced according to the manipulation of the aforesaid conditions, which are all under the easy and perfect control of the operator. This is a great advantage over manufactured dextrine, whose character is fixed when made and which can be varied little except toward the glucose state when afterward acted on by hot water. By my improvement, however, any state can be readily and quickly obtained by the user from gelatinous starch to glucose at the will of the operator, and hence he can readily control and determine at each operation the desired consistency and quality to be imparted to the desired product, whether more or less pasty or more or less liquid, which is a practical advantage of the greatest importance and will render this improved adhesive powder of great value in producing laundry stiffening-sizes for textiles in the manufacture of pastes, mucilages, &c.

It will be noted that in using my improved adhesive powder no further trouble or operation is necessary with it than is used with ordinary starch or dextrine, that is, the impregnated starch may be mixed in a milky fluid with cool or tepid water and this milky mixture poured into hot or boiling water and the mixture then heated or boiled to the desired extent, the same as in using starch, or the impregnated starch may be added directly to the hot water and then stirred vigorously and thus dissolved therein in the same way that dextrine is used. Hence while the operation or manipulation in using my improved adhesive powder is about the same as is used with starch or dextrine, yet the great advantage is that with no greater labor or trouble dextrine can thus be produced *de novo* by each consumer at much less cost than by using the manufactured article, and the quality of the product is absolutely under the control of the operator.

One great objection found in the use of manufactured dextrines is that as a matter of fact no two individual lots of dextrine—particularly in white dextrine—can be made exactly alike, as the degree of conversion of the starch cannot be absolutely controlled to any great exactitude by the present methods of manufacture. Hence in making pastes or sizes with such dextrines different effects will be got by different individual lots, which uncontrollable variations will be obviated by my invention, as in this case the variations will be entirely under the control of the operator in making the solution.

Dextrines are usually made from potato-starch, which is much more expensive than corn-starch, whereas corn-starch is much more dense or adhesive than potato-starch. Corn-starch, however, is not used so much for making dextrine, because it contains such a strong yellow coloring-matter, derived, presumably, from the husk, which it seems cannot be wholly got rid of and which under the action of the acid in the high and dry heat of the usual converting process produces a product of a very dark color, although the original corn-starch is itself as white as the potato-starch. Hence corn-dextrine is a very dark-colored article and for that reason has a diminished market value as compared with potato-dextrine. By my invention, however, I can produce a dextrine paste from corn-starch without developing the dark color referred to, which seems to be produced only at a high dry heat, and the paste so produced will be as white as that obtained from potato-dextrine, much less costly, and more tenacious or adhesive. This is a great advantage, particularly in our country, where corn-starch is such an extensive and cheap product, whereas potato starch and dextrine are made chiefly in Germany. My invention will thus enable our native product of corn-starch to be utilized in the production of dextrine pastes, which will be equal or superior to that made from foreign potato-dextrine and at about half the cost or less, which is a further important advantage of this invention.

After the impregnated starch has been dissolved in the hot water, as described, and brought to the desired condition I prefer to neutralize the acid and arrest further converting action and render the solution neutral or alkaline, and for this purpose I prefer to use caustic soda or borax. If borax is used, it will not only neutralize the acid, but combine chemically with the resulting dextrine and increase its adhesiveness, as described and covered by the United States Patent No. 466,239, issued to me December 29, 1891. The proper or preferred proportion of borax to use would be about three ounces to every pound of the acidulated starch, an excess of borax being desired to give the solution a decided alkaline reaction and combine with the resulting dextrine, as set forth in said patent. This proportion is best for pastes or adhesives, but for textile sizing, where strong alkaline reaction would be objectionable, the amount may be reduced to or near neutrality, if desired.

I greatly prefer the use of borax for a neutralizing substance over caustic soda on account of its simple harmless nature and of its combining chemically with dextrine, as described, and because an excess may be used over neutrality without darkening the product, whereas a very little excess of the caustic soda would have a very darkening effect. Where, however, caustic soda is used for neutralizing, I prefer to mix boracic acid with the acidulated starch, say one to two ounces of boracic acid to each pound of starch, which boracic acid will combine chemically with the dextrine as soon as formed and which will be afterward changed to borax when neutralized by the caustic soda, as will be understood.

In putting up my improved adhesive powder for the market I prefer to pack it in sealed packages, which will contain within the same the proper proportionate mass of neutralizing alkaline powder isolated from the acidulated starch, but embedded within the same, as shown in the drawings. Thus in Fig. 2 K represents a small box of wood, paper, or pasteboard, duly sealed and containing a closely-packed mass of the acidulated starch powder, within which is embedded a small receptacle N, of glass or other acid-proof material, (shown in dotted lines in Fig. 2,) and containing the caustic soda or borax in a finely-powdered or granulated form, preferably borax, as before described. In Fig. 3 the receptacle $k$ is made of glass with a screw-cap $o$, or it may be of metal, suitably coated or treated to prevent any corrosive action of the acid with which the starch is impregnated. Within this glass or metal jar K is inclosed a smaller jar N, containing the neutralizing-powder T, as clearly shown in the drawings. This jar may be made of glass with a glass or leaden cap, or it may be made of metal, paper, or other material not acted on by acid or alkali. In Fig. 4 is represented a large commercial package in the form of a barrel or cask K, in which the impregnated starch F is packed and within which is embedded the isolating-receptacle N, containing the neutralizing-powder T. In each case the amount of this powder is duly proportioned to the acidulated starch, as will be understood.

It will therefore now be seen that by the described mode of packing the acidulated starch in sealed packages, containing the proper amount of neutralizing-powder embedded therein, the two elements of the adhesive compound to be finally produced therefrom are thus presented in a very safe and convenient form and are ready for immediate use by the consumer. When the package is first opened, the user will take out the alkaline packet N and lay it aside for use when an adhesive mixture is to be made, as will be readily understood.

Instead of using a liquid acid for impregnating the starch any of the suitable dry or solid acids in a powdered form may be used. For example, oxalic acid may be so used, being reduced to a powder and intimately mixed with the starch in the mixer A, as shown in Fig. 1. In this case no water or moisture will be used. Malt is another digesting or converting agent which can be used, and this can be sprinkled in a liquid diluted form or used dry and finely ground and mixed with the starch. I prefer, however, to use a mineral acid, as first described, as it is less expensive and generally much more effective for the desired purpose. If oxalic acid is used, about twice the quantity should be used as compared with the sulfuric. If malt is used, about the same proportion as the sulfuric acid up to twice the quantity will suffice.

When wheat or other flour is prepared in the mixer A instead of starch, more care should be used in the sprinkling of the dilute acid, so as to apply it finely and gradually, so as to avoid any excessive wetting at one point, which might produce the formation of lumps or dough, the mixing and impregnating operation being thus conducted so as to cause the gradual even absorption of the dilute acid, producing a dry or practically dry powder as the resulting product.

It will be readily understood that when flour thus treated is dissolved in hot or boiling water and afterward neutralized by the borax, as already described in reference to the starch, a flour paste of very novel and superior quality will be produced, in which both the starch and gluten will be in a state of solution or perfect combination with the water, and hence will possess a much smoother and more homogeneous texture, will have great adhesive power, and will be permanent in its nature and not subject to watery separation and decay.

I prefer to use, as already stated, preferably raw starch or flour, but it will not be objectionable or any departure from my invention to heat the flour or starch by a dry heat before applying the acid, so as to thoroughly dry the same and make it more absorbent to the acid, and this heat may be so extended sometimes as to partly cook or roast the starch or flour before the acid is applied thereto; but I prefer to act on perfectly raw starch or flour, as this is all that is necessary for the purpose of my invention.

The starch or flour may be dried after being impregnated with the dilute acid to drive off most of the water of dilution, but it will not be actually necessary, as the amount of moisture is small and the absorbing power of the starch very great.

What I claim as new is—

1. Starch or flour in a raw or unconverted state impregnated with a digesting acid or agent sufficient to change or convert the starch into dextrine when dissolved in hot or boiling water, substantially as herein set forth.

2. An improved adhesive compound consisting of raw starch or flour treated with a sufficient quantity of a digesting or converting substance incorporated therewith, forming a dry loose powder, adapted to be readily dissolved in hot or boiling water and thereby produce a dextrine paste or size at will, substantially as herein set forth.

3. An improved adhesive compound in a dry powdered form, consisting of starch or flour impregnated with an active digesting-acid combined with boracic acid, the said acid or acids being sufficient to convert the starch into dextrine when dissolved in hot water, substantially as and for the purpose set forth.

4. An improved adhesive compound formed in two individual dry powdered masses adapted to be subsequently combined, the first consisting of starch or flour combined with a converting-acid incorporated therewith, in sufficient quantity to convert the starch into dextrine when dissolved in hot water, the second consisting of an alkaline powder for neutralizing the former when added to the solution thereof, substantially as herein set forth.

5. An improved adhesive compound formed in two individual separated masses adapted to be subsequently combined, the first consisting of starch or flour and a digesting substance combined therewith, in sufficient quantity to convert the starch into dextrine when dissolved in hot water, the second consisting of powdered borax adapted to be added to the former after being dissolved in hot or boiling water, substantially as and for the purpose set forth.

6. As a new article of manufacture, a definite mass of starch or flour impregnated with a digesting agent, in sufficient quantity to convert the starch into dextrine when dissolved in hot water, and inclosed in a sealed package in combination with a proportional mass of neutralizing-powder inclosed in an isolating-packet and embedded within the former package, substantially as herein shown and described.

7. The external sealed package $k$ containing a mass of starch F sufficiently acidulated to convert it into dextrine when dissolved in hot water, in combination with the inclosed isolating-packet N containing neutralizing-powder T, substantially as and for the purpose set forth.

8. The herein-described process of producing a starch or dextrine paste or size, viz., first impregnating raw starch or flour with a digesting acid or agent in sufficient quantity to produce its conversion into dextrine, then dissolving said impregnated starch in hot water, whereby a starch or dextrine paste of various qualities may be produced at will, substantially as and for the purpose set forth.

In testimony whereof I affix my signature, in the presence of two witnesses, this 9th day of June, 1896.

CHAS. M. HIGGINS.

Witnesses:
 THOS. E. ROBERTSON,
 W. E. CLENDANIEL.